US011034200B2

(12) United States Patent
Genheimer et al.

(10) Patent No.: US 11,034,200 B2
(45) Date of Patent: Jun. 15, 2021

(54) DEVICE FOR DETECTING THE POSITION OF A FIRST OR SECOND VEHICLE TO BE COUPLED TOGETHER

(71) Applicant: JOST-WERKE DEUTSCHLAND GMBH, Neu-Isenburg (DE)

(72) Inventors: Christian Genheimer, Höchberg (DE); Dieter Raab, Rödermark (DE); Swen Saupe, Mainz (DE); José Manuel Algüera, Aschaffenburg (DE)

(73) Assignee: JOST-WERKE DEUTSCHLAND GMBH, Neu-Isenburg (DE)

( * ) Notice: Subject to any disclaimer, the term of this patent is extended or adjusted under 35 U.S.C. 154(b) by 330 days.

(21) Appl. No.: 16/336,280

(22) PCT Filed: Sep. 26, 2017

(86) PCT No.: PCT/EP2017/074369
§ 371 (c)(1),
(2) Date: Mar. 25, 2019

(87) PCT Pub. No.: WO2018/060192
PCT Pub. Date: Apr. 5, 2018

(65) Prior Publication Data
US 2019/0337342 A1   Nov. 7, 2019

(30) Foreign Application Priority Data

Sep. 27, 2016   (DE) .................... 10 2016 218 603.5

(51) Int. Cl.
*B60D 1/36*   (2006.01)
*B60D 1/01*   (2006.01)
(Continued)

(52) U.S. Cl.
CPC ............... *B60D 1/36* (2013.01); *B60D 1/015* (2013.01); *B60D 1/62* (2013.01); *B60D 1/46* (2013.01); *B60D 1/64* (2013.01)

(58) Field of Classification Search
CPC . B60D 1/36; B60D 1/015; B60D 1/62; B60D 1/46; B60D 1/64
See application file for complete search history.

(56) References Cited

U.S. PATENT DOCUMENTS 7,535,346 B2 *   5/2009   Kalous .................. B60Q 1/305
340/425.5
8,038,166 B1 *   10/2011   Piesinger ................ B60D 1/58
280/477
(Continued)

FOREIGN PATENT DOCUMENTS

DE   10 2006 040 879 A1   3/2008
DE   10 2006 057 610 A1   4/2008
(Continued)

*Primary Examiner* — Kevin Hurley
*Assistant Examiner* — Marlon A Arce
(74) *Attorney, Agent, or Firm* — Hudak, Shunk & Farine Co. LPA

(57) ABSTRACT

A device for detecting the position of a first or second vehicle to be coupled together, having a sensor device which can be arranged on the first or second vehicle and which detects at least one reference point of the other second or first vehicle using sensors. A device for detecting the position of a first or second vehicle to be coupled together, said device allowing an operationally reliable and precise coupling regardless of present environmental influences. The sensor device has at least one transceiver unit, and the at least one reference point can be equipped with a transponder which reflects a radio signal of the transceiver unit.

14 Claims, 4 Drawing Sheets

(51) Int. Cl.
*B60D 1/62* (2006.01)
*B60D 1/64* (2006.01)
*B60D 1/46* (2006.01)

(56) References Cited

U.S. PATENT DOCUMENTS

| | | | |
|---|---|---|---|
| 10,189,324 B2* | 1/2019 | Opitz | G05D 1/021 |
| 10,556,473 B2* | 2/2020 | Strand | B60D 1/44 |
| 2009/0236825 A1* | 9/2009 | Okuda | B60D 1/36 |
| | | | 280/477 |
| 2010/0013188 A1 | 1/2010 | Ortmann et al. | |
| 2015/0137463 A1* | 5/2015 | McLennan | B60G 17/016 |
| | | | 280/6.153 |

FOREIGN PATENT DOCUMENTS

| | | |
|---|---|---|
| DE | 103 22 765 B4 | 6/2008 |
| DE | 10 2014 212 821 A1 | 1/2016 |

* cited by examiner

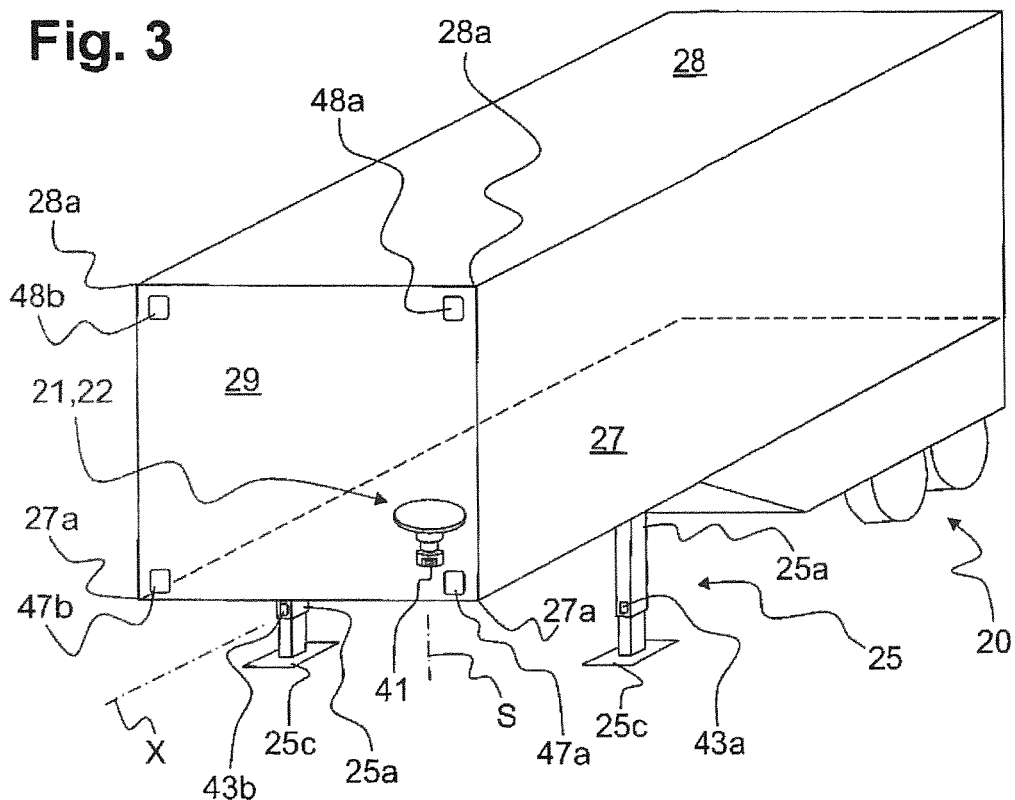
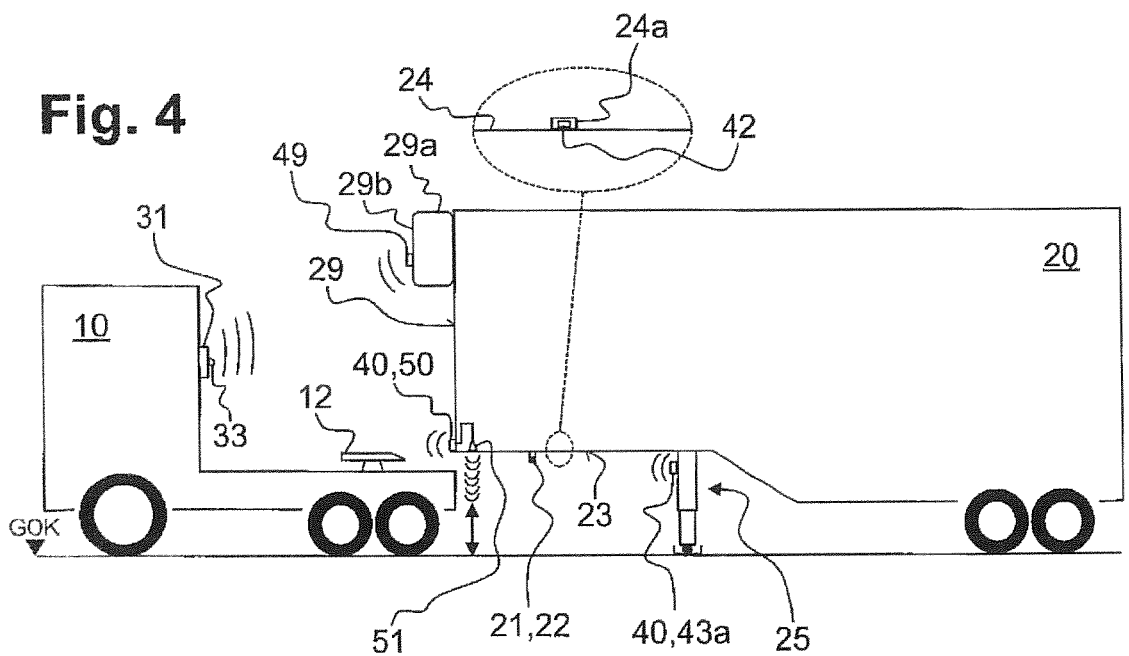

DEVICE FOR DETECTING THE POSITION OF A FIRST OR SECOND VEHICLE TO BE COUPLED TOGETHER

FIELD OF THE INVENTION

The invention relates to a device for detecting the position of a first or second vehicle to be coupled together, having a sensor device which can be arranged on the first or second vehicle and which detects at least one reference point of the other second or first vehicle using sensors.

BACKGROUND OF THE INVENTION

The first and second vehicle are releasably joined together by compatible coupling means, the first vehicle being the hauling vehicle and for this purpose generally being equipped with an engine to propel it. The second vehicle or vehicles are then a nondriven trailer vehicle, which is hauled by the first vehicle. The first vehicle for example may be a tractor with a fifth wheel and the second vehicle a trailer with a kingpin. Such connected first and second vehicles are also known as an articulated vehicle. Alternatively, the first vehicle may also be a motor car with a pin coupling arranged at its rear end and the second vehicle may be a drawbar trailer with a drawbar eye formed at the end of the drawbar. First and second vehicles coupled together in this way are also called an articulated train. Furthermore, hybrid forms are also conceivable, in which for example the first vehicle is a tractor, with a semitrailer coupled directly to it, and a drawbar trailer coupled to the latter. In an isolated consideration of trailer vehicles, the pulling vehicle, such as the semitrailer, would be the first vehicle and the pulled vehicle, such as the drawbar trailer, would be the second vehicle.

There have already been efforts to have the aforementioned vehicles drive autonomously at a depot, that is, without the presence of a driver in the first vehicle. DE 103 22 765 B4 discloses one such automated depot for autonomously driving vehicles. The autonomous driving also includes an automated coupling and uncoupling of the first and second vehicle. The depot may furthermore be equipped with an automatic filling station and/or with an automatic washing station, in order to fuel and wash the respective vehicles as needed.

From DE 10 2006 057 610 A1 there is already known an assistance system which is supposed to help the driver in coupling, docking, or driving of the first vehicle under a target object. By a target object is meant a trailer, semitrailer, swap body or loading ramp. The known assistance system comprises basically an image sensor and a calculating unit, with the aid of which the target object height is supposed to be set at the first vehicle. Thus, for example, a particular target object can be recognized by a scene analysis and be coordinated with memorized model data, so that at least an approximate target object height is preset at the first vehicle before the actual coupling is done. The known assistance system, however, is based solely on an image sensor, which provides an image of the second coupling means to an electronic controller, which in turn is supposed to identify the second coupling means with a suitable software. But object recognition by means of an image sensor has proven to be not very reliable, since it is particularly sensitive to changing light conditions and the unavoidable dirt and grime during operation. The becomes especially disadvantageous in the case of autonomously maneuvering vehicles, when no driver is present to intervene in the coupling process.

SUMMARY OF THE INVENTION

Therefore, the problem which the invention proposes to solve was to provide a device for detecting the position of a first or second vehicle being coupled together that makes possible a reliable and precise coupling independently of prevailing environmental influences.

This problem is solved according to the invention by the characterizing features of wherein the sensor device has at least one transceiver unit, and on the at least one reference point there can be fastened a transponder, which reflects a radio signal of the transceiver unit. With the aid of a radio-based locating, the transceiver unit detects the transponder situated in its metered spatial region. The transponder is coordinated with a defined position in regard to the transceiver unit of the other vehicle and is detected by the transceiver unit. The locating results from a measuring of the travel time of radio signals, initiated by the transceiver unit, which signals are received, processed, and reflected by the transponder. From the measurement of the travel time of the radio signal, the direct distance from the transponder to the transceiver unit can be determined in real time.

Advantageously, additional information about the vehicle or the type of vehicle to which the transponder is permanently fastened can be stored in the transponder. The vehicle type defines whether the second vehicle is a semitrailer with a kingpin or a drawbar trailer with a drawbar eye formed at the end of the drawbar. In this way, one can prevent, for example, a tractor in autonomous driving mode from wrongly trying to couple onto a drawbar trailer.

By a transponder is meant a radio communication device that receives incoming signals and automatically answers or relays them onward. According to the invention, both passive transponders and active transponders can basically be used. Passive transponders draw their energy needed for the communication and the working off of their internal processes exclusively from the read/write unit, in the present case the transceiver unit(s). Passive transponders do not require any power supply of their own and they can work at the comparatively short distances prior to the coupling of the first and second vehicle. The best-known kind of a passive transponder is radio frequency identification RFID. The core of such a passive transponder is the built-in RFID chip.

Active transponders have their own power supply. Either they have a built-in battery or they are connected to an outside power grid. Not only does this make possible larger communication ranges, but also the managing of rather large data storages and the operation of integrated sensors can be realized. Due to the need for a power supply in the case of active transponders, one will preferably always resort to passive transponders whenever no additional data needs to be transmitted to the transceiver unit, for example from other sensors connected to the active transponder.

Preferably, multiple reference points are present on the other second or first vehicle, at each of which there can be secured a transponder, and each transponder encodes the echo individually such that it can be distinctly coordinated with the particular transponder. The accuracy of the locating can be made more precise if the multiple transponders situated at the respective reference points are arranged at a known distance from one another. In a fleet of vehicles, this distance from the transponder to the vehicle being detected can always be chosen to be the same and can be stored in the transceiver unit.

Advantageously the sensor device comprises an electronic controller, which calculates from the travel time of the radio signal the direct distance to the at least one transponder. The electronic controller can either be integrated in the transceiver unit and form an integral component with it or it can be arranged as a separate component on the vehicle. The electronic controller can provide a control signal to the first vehicle based on the measurement of the travel time of the radio signal to the transponder(s), by which the control of the vehicle can be influenced. The control of the vehicle includes a manipulation of the transmission, the engine controls, the steering, the level regulation (air suspension) and/or the brake.

It has been found to be particularly favorable when the sensor device comprises at least one antenna which is connected to the respective transceiver unit. Via the antenna, the radio signal of the transceiver unit is emitted and the echo reflected from the transponder(s) is received. Insofar as multiple transceiver units are present, each of the transceiver units can have its own antenna. Usually the antenna is integrated in the respective transceiver unit and forms a common component with it.

Preferably the transceiver unit sends and receives a radar signal via the antenna, while advisedly the radio signal is a radar signal in a frequency range of 1 GHz to 10 GHz, especially preferably 4 GHz to 7 GHz, most especially preferably 5 GHz to 6 GHz.

The invention also relates to a road train, wherein the road train comprises a first and at least one second vehicle. According to a first preferred embodiment, the sensor device comprises a transceiver unit situated on the first vehicle and at least one transponder situated on the second vehicle. In this way, an at least two-dimensional locating of the second vehicle can be realized during the approach of the first vehicle prior to the coupling. Therefore, the road train in particular involves articulated vehicles whose drawbar trailers are parked free standing and without support elements, such as support jacks, so that the drawbar of the parked second vehicle also remains in a relatively narrow spatial framework and is docked with the pin coupling of the first vehicle during the next coupling event.

According to an alternative, second embodiment, a second transceiver unit with a second antenna is arranged in a vertical height clearance from the transceiver unit and is connected to the electronic controller. The two controllers detect the transponder or transponders of the second vehicle and make possible a detecting of its position, especially also its height condition, by means of cross pinpointing or triangulation. Suitable road trains may be both articulated vehicles and also semitrailer trains or hybrid forms of the two. In the case of the latter mentioned semitrailer trains, the front end of the uncoupled semitrailer is supported by support jacks, whereby the height condition of the front end may vary greatly. Thanks to a three-dimensional locating by two transceiver units, semitrailers can also be picked up and coupled especially accurately by autonomous driving tractor vehicles.

According to an alternative, third embodiment, an active transponder is situated at the end of the second vehicle facing toward the first vehicle, wherein the active transponder is connected to a height measuring sensor and the measurement signal of the height measuring sensor together with its individual encoding is relayed to the transceiver unit. In this embodiment, the height condition of the coupling means situated on the second vehicle is determined by a height measuring sensor situated for this on the second vehicle, instead of by a second transceiver unit, and a three-dimensional orientation of the second vehicle is determined in this way. The height measuring sensor may be an infrared sensor, ultrasound sensor, laser range finder or mechanical encoder, which determine the extended state of the support jacks and use a potentiometer to put out an electrical voltage varying in dependence on the extended state. The measurement signal of the height measuring sensor, if the latter is connected to an active transponder, is relayed together with its encoding to the transceiver unit. The road trains may be articulated vehicles or semitrailer trains or hybrid forms of the two.

Advantageously, the second vehicle comprises a coupling means, which can be in particular a kingpin fastened to the second vehicle. The kingpin is connected firmly to the semitrailer on its bottom side and when coupled onto a first vehicle it is received and locked by its fifth wheel.

Favorably, the kingpin comprises a fastening flange, an upper collar connected to the latter at the bottom, a small-diameter locking section and a lower collar, wherein a first recess is made in a bottom side of the lower collar, in which a first transponder is installed. This affords the advantage that the transponder is not surrounded by the steel of the kingpin at the bottom and accordingly it is favorably detected by the transceiver unit(s). Moreover, in the recess the transponder is effectively protected from mechanical influences and not exposed to any wear-related perturbation. The transponder may be additionally evacuated by a plastic in the recess, in particular, covered by a plastic casting compound.

Advisedly, the recess is arranged in the swivel axis of the kingpin. Consequently, the transponder is also always situated in the vehicle lengthwise axis of the second vehicle and helps position an autonomously approaching first vehicle likewise in the vehicle lengthwise axis of the second vehicle.

Preferably, a trailer plate is formed on a bottom side of the second vehicle, which in the coupled condition is supported on a fifth wheel, wherein a second recess is formed in the trailer plate, in which a second transponder is installed. The trailer plate generally stretches across the entire width of the semitrailer and thereby enables a largely free positioning of the second transponder. Thanks to accommodating the second transponder inside the second recess, it is not detected in the coupled state by the fifth wheel, yet it enables a detecting by the transceiver unit via the downwardly open side of the second recess prior to the coupling. The transponder can additionally be evacuated by a plastic in the recess, in particular, covered by a plastic casting compound.

At least one support jack can be arranged on the second vehicle, to which a third and/or fourth transponder is secured. The support jack usually has a stationary section by which the support jack is fastened on the semitrailer, and a telescopic section, at the end of which a support foot is situated, which in the extended state of the support jack makes contact with the ground. The third and/or fourth transponder can favorably be situated on the stationary section, especially if the height of this transponder is supposed to be detected by means of triangulation. Since the support jacks are mounted in pairs and symmetrically on the semitrailer, it makes sense to arrange the third transponder on a support jack and the fourth transponder on the second, opposite situated support jack, in order to obtain reference points which are laterally spaced apart from the vehicle lengthwise axis.

Advantageously, the electronic controller receives a signal regarding the height condition of the air suspension. The air suspension, depending on its settings, ensures a lifting of the chassis and thereby may change the height condition of the overall sensor device and hence also the height condition of the antenna(s). Changes in the extension travel of the air suspension are detected by the electronic controller, which compensates for them in relation to the actual height of the antenna(s).

It has proven to be especially favorable when a lowest height condition of the antenna(s) above the road level with the air suspension lowered can be entered in the electronic controller. The lowest height condition of the antenna(s) varies for the first vehicles according to the installation location and furthermore it is dependent on the manufacturer of the particular air suspension installed. After the final mounting of the antenna(s), the lowest height of the antenna(s) can be measured and manually programmed in the electronic controller as an offset. The electronic controller can then calculate the actual height of the antenna(s) from a lifting distance of the air suspension and the lowest height condition.

According to an alternative, fourth embodiment, the sensor device comprises a transceiver unit situated on the second vehicle and a fifth transponder is situated on the first vehicle. As compared to the previous embodiments, preferably the sensor device is not situated on the first, but instead on the second vehicle, and at least one transponder is situated on the first, instead of the second vehicle. This embodiment makes necessary an independent power supply for the second vehicle, such as a battery or a storage cell, which can also be charged permanently via a solar cell. A road train outfitted in this way corresponds to the first embodiment, yet with first and second vehicles interchanged. In this way, an at least two-dimensional locating of the first vehicle can be accomplished, wherein the measured value identified by the transceiver unit is converted in the electronic controller preferably likewise situated on the second vehicle into a distance value from the transponder(s) and this is sent wirelessly by means of a data radio transmitter to the first vehicle. The first vehicle has a corresponding data radio antenna for this. This is connected in turn to a vehicle controller, which influences the driving functions of the first vehicle and takes on the autonomous maneuvering and coupling.

Preferably, at least one support jack is arranged on the second vehicle with a stationary section relative to the second vehicle and a telescopic section, and a sixth transponder is secured to the telescopic section. Especially favorable is the placement of the sixth transponder on a support foot of the telescopic section. In this embodiment, in addition to the two-dimensional position detection, the height condition of the second vehicle is obtained from a measurement of the lift height by means of a support jack. Since the support jack is always secured by its stationary section on the second vehicle at the same distance from the antenna of the transceiver unit and furthermore is oriented at right angles to the trailer plate, the lift height of the support jack can be calculated by a measurement of the distance between the antenna and the sixth transponder. The major benefit of this embodiment is that both the lateral orientation of the first vehicle and the height determination of the second vehicle are done by robust transponders and no other sensor types need to be implemented and calibrated.

Advisedly, the first, second and/or fifth transponder is situated in the vehicle lengthwise axis of the first or second vehicle. Thanks to this arrangement, a position detection can be achieved already with one or a few transponders.

The coupling means may also be a drawbar eye situated at the end of a drawbar. This configuration is typically relevant to articulated trains.

Advantageously, a third recess is formed in the drawbar and/or in a section around the drawbar eye, in which a seventh transponder is installed. The transponder can be additionally evacuated by a plastic in the third recess, in particular, it can be covered by a plastic casting compound. For a rigid drawbar, a transponder so arranged can mark the vehicle lengthwise axis.

Advisedly, the second and/or first vehicle has a bodywork floor with two lower corners at its end close to the other first or second vehicle, with an eighth and ninth transponder secured at the lower corners. In this way, reference points situated far away from the vehicle lengthwise axis are measured by the transceiver unit, making possible an especially accurate position detection.

Preferably, the second and/or first vehicle has a roof wall with two upper corners at its end close to the other first or second vehicle, and a tenth and eleventh transponder is secured to the upper corners. In this embodiment as well, reference points with maximum lateral offset from the vehicle lengthwise axis are detected and the accuracy of the position detection is improved. Furthermore, the overall height of the second vehicle can be detected for example as additional information and provided to the first vehicle, especially for optimal adjustment of a roof spoiler.

It may also be the case that an add-on unit is formed at a front side of the second vehicle, sticking out in the direction of the first vehicle. In this case, a twelfth transponder can be secured to the front side of the add-on unit. Such add-on units often protrude into the standardized contour of the semitrailer or trailer front and minimize the size of the gap remaining between the first and second vehicle. By an add-on unit is meant, for example, refrigerating units. The detection of the front side of the add-on unit prevents a collision between an oversized add-on unit and portions of the first vehicle during the autonomous coupling process.

Favorably, at least three of the transponders are arranged at a given distance from each other, since with three reference points a plane is subtended and the position of this subtended plane serves for an especially accurate position detection of the first or second vehicle, given knowledge of other dimensions of the first or second vehicle.

BRIEF DESCRIPTION OF THE DRAWINGS

For a better understanding, the invention shall now be explained more closely with the aid of seven figures. There are shown:

FIG. 3: a perspective front view of a semitrailer with transponders fastened to it;

FIG. 4: a side view of a device according to a second embodiment, arranged on a tractor, with a transceiver unit at the tractor vehicle side and a height measuring sensor at the semitrailer side, prior to the coupling;

DETAILED DESCRIPTION OF THE INVENTION

Figure 1:
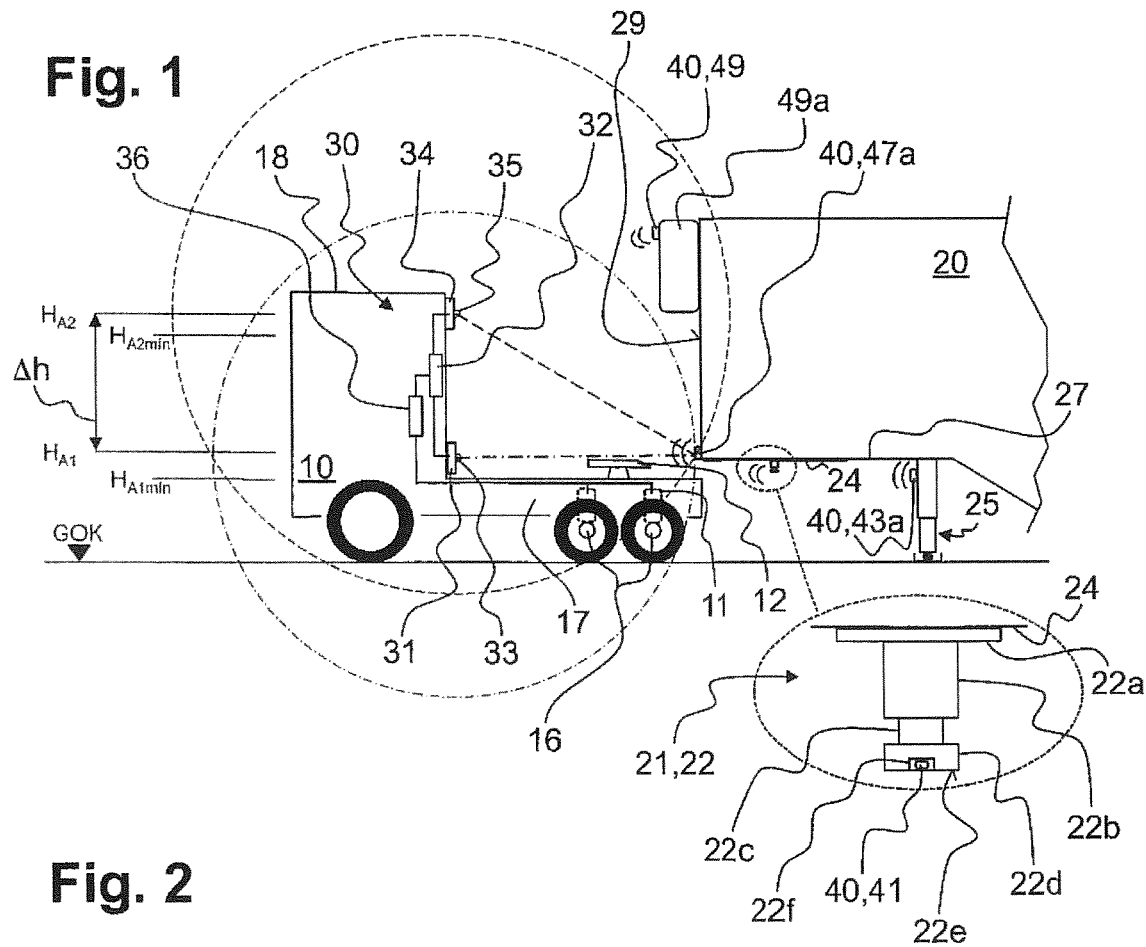
FIG. 1: a side view of a device according to a first embodiment, arranged on a tractor, with first and second receiver unit arranged on the rear wall of the driver's cabin.

FIG. 1 shows an articulated train formed from a first vehicle 10 and a second vehicle 20 in a side view. The first vehicle 10 is in a still separated position in front of the second vehicle 20, which is standing on its two support jacks 25. The support jacks 25 are arranged on the second vehicle 20 on both sides of the vehicle lengthwise axis X (see FIG. 3) and hold the end of the second vehicle 20 facing toward the first vehicle 10 in the height condition shown, according to their state of extension.

Figure 2:
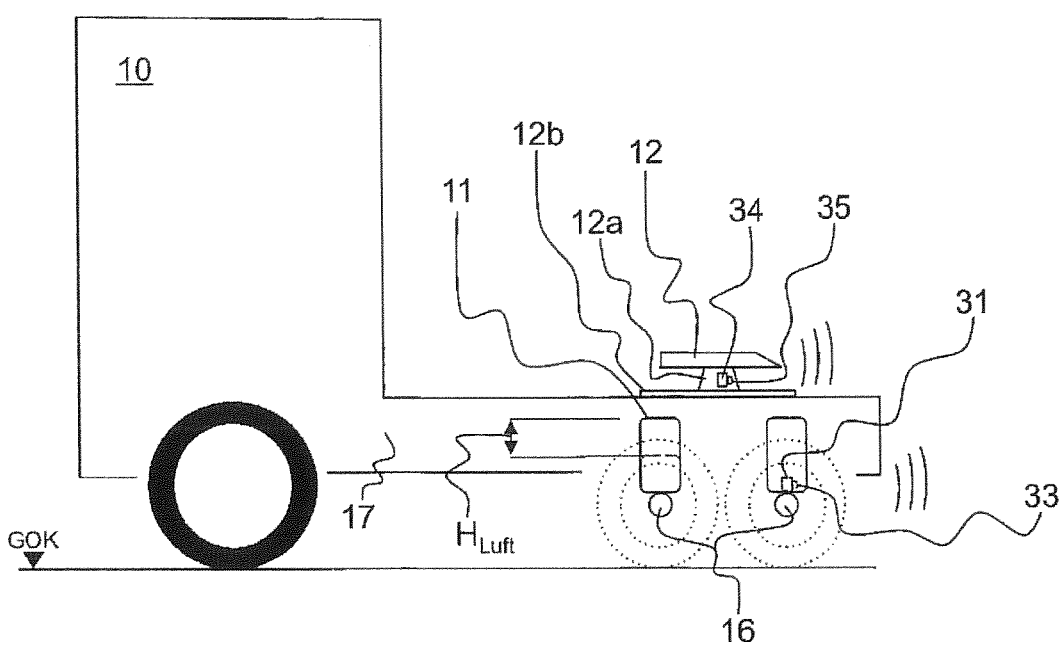
FIG. 2: a side view of a device according to the first embodiment, arranged on a tractor, with first and second receiver unit arranged in the area of the fifth wheel and rear axle.

The first vehicle 10 is outfitted with an air suspension 11, which is braced against rear axles 16 and lowers or raises the vehicle chassis 17 by the lifting distance $H_{Luft}$ shown in FIG. 2. Depending on the lifting distance $H_{Luft}$, a fifth wheel 12 located on the first vehicle 10 also changes its height condition together with the vehicle chassis 17. For a coupling of the second vehicle 20 to the first vehicle 10, the latter moves backwards far enough underneath the second vehicle 20 until a coupling means 21 arranged thereon in the form of a downwardly projecting kingpin 22 achieves an operative engagement with the fifth wheel 12.

The kingpin 22 has an upper fastening flange 22a, by which the kingpin 22 is firmly connected to the second vehicle 20, especially being screwed together. Toward the bottom, the fastening flange 22a passes into an upper collar 22b, which adjoins a diameter-reducing locking section 22c. The locking section 22c is bounded at the bottom by a lower collar 22d, whose diameter agrees with that of the upper collar 22b. The locking section 22c engages with a locking mechanism (not shown) of the fifth wheel 12 and in this way holds the kingpin 22 in pivoting manner in the fifth wheel 12. Immediately above the kingpin 22 there stretches a trailer plate 24, fastened to an underside 23 of the second vehicle 20, which lies against the fifth wheel 12 when the first and second vehicles 10, 20 are joined together and slides across the fifth wheel 12 when negotiating curves.

For a secure coupling of the second vehicle 20 to the first vehicle 10, the fifth wheel 12 must be oriented beneath the vertical level of the trailer plate 24, yet at the same time enable a movement of the kingpin 22 into the fifth wheel 12, without moving across the fifth wheel 12 on account of the first vehicle 10 being lowered too much.

Besides the above described detecting of the height condition of the second vehicle 20, the first vehicle 10 must also be properly oriented laterally to the kingpin 22 with its fifth wheel 12. This is especially easily achieved when the position of the kingpin 22 and/or the entire second vehicle 20 can be ascertained with the help of individual reference points 40 defined on it.

For this, the vehicles 10, 20 are provided with a device for position detection. The device comprises, at the first vehicle 10, a sensor device 30, having a transceiver unit 31, a second transceiver unit 34 and an electronic controller 32. The two transceiver units 31, 34 are spaced apart from each other by a constant vertical height clearance Δh. In the present exemplary embodiment of FIG. 1, the transceiver units 31, 34 are fastened to the rear wall of a driver's cabin 18 of the first vehicle 10.

On the second vehicle 20 there are arranged multiple transponders 41, 43a, 47a, 48a, 49 at defined reference points 40, each transponder 41, 43a, 47a, 48a, 49 being detected by the transceiver units 31, 34.

The first transponder 41 is integrated in the kingpin 22, which is formed preferably for this purpose on an underside 22e of the lower collar 22d with a first recess 22f. The first recess 22f is open at the bottom and receives the first transponder 41 therein in protected manner. The first transponder 41 is thus constantly arranged in the vehicle lengthwise axis X of the second vehicle 20 and furthermore is located in the swivel axis S running through the kingpin 22 (see FIG. 3). The first transponder 41 thus also especially effectively supports the orienting of a first vehicle 10 approaching the second vehicle 20 at a slant prior to the coupling process.

The support jacks 25, as can be seen especially well in FIG. 3, comprise a stationary section 25a, with which the support jack 25 is secured to the second vehicle 20, and a telescopic section 25b with a support foot 25c at its end. On the stationary sections 25a is secured a third and fourth transponder 43a, 43b, only the third front transponder 43a in the plane of the drawing of FIG. 1 being visible. The third and fourth transponders 43a, 43b arranged on the support jacks 25 are spaced apart from the vehicle lengthwise axis X especially far to the side and assist in performing an especially exact position determination of the second vehicle 20 laterally to the vehicle lengthwise axis X.

On the second vehicle 20 shown in FIG. 1, at its front end 29, there can be seen an add-on unit 29a, which in turn carries the twelfth transponder 49 at its front end 29b. The twelfth transponder 49 in addition to the position determination also serves for detecting the front end 29b of the add-on unit 29a and preventing the add-on unit 29a from hitting the driver's cabin 18.

The transceiver unit 31 has an antenna 33 and the second transceiver unit 34 has a second antenna 35, the antennas 33, 35 respectively putting out a radio signal, which for example arrives at the eighth transponder 47a and is reflected by it. The eighth transponder 47a is arranged at one of the lower corners 27a in the transition area of the front end 29 of the second vehicle 20 to its bodywork floor 27.

The respective transceiver unit 31, 34 identifies the corresponding radio signal reflected from the eighth transponder 47a and provides it to the electronic controller 32, which calculates from it a distance to the eighth transponder 47a. The eighth transponder 47a, shown as an example, lies at the intersection of the distance measurements of the two transceiver units 31, 34.

Figure 5:
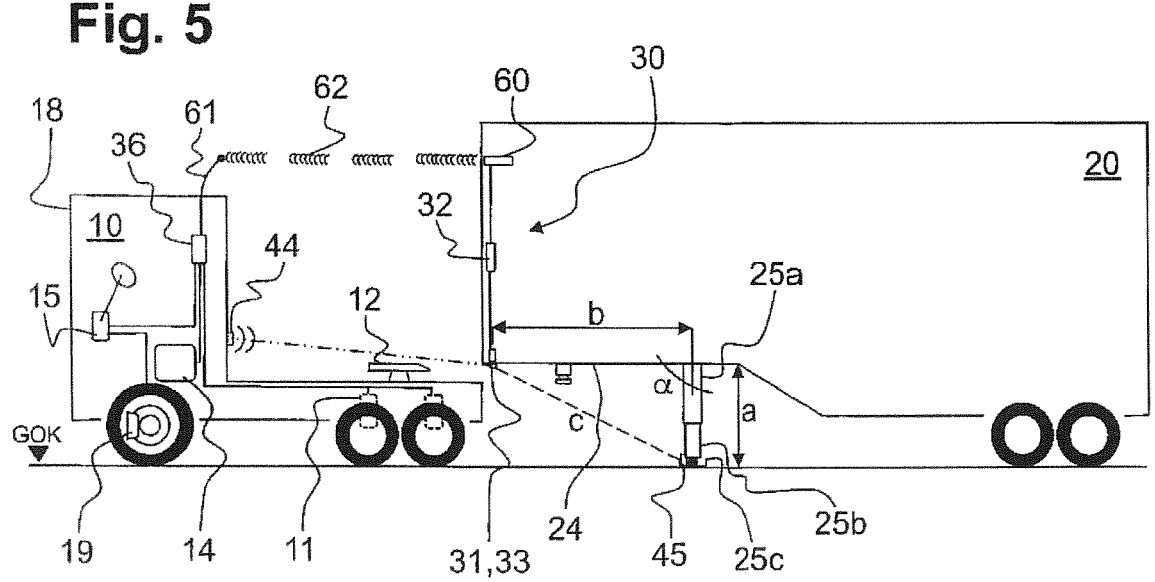
FIG. 5: a side view of a device according to a third embodiment, arranged on a tractor, with transponders on the tractor and the support jack.

The electronic controller 32 also communicates with a vehicle controller 36, which influences the indicated air suspension 11 and the components of the first vehicle 10 represented in FIG. 5, especially the engine and transmission 14, the vehicle steering 15 and/or the brake 19. The vehicle controller 36 provides data to the electronic controller 32 as to the current actual status, such as the lifting distance $H_{Luft}$ of the air suspension 11, so that the electronic controller 32 can correct the lowest height condition $H_{A1min}$ of the antenna 33 and the lowest height condition $H_{A2min}$ of the second antenna 35 by the lifting distance $H_{Luft}$ and thus calculate an actual height $H_{A1}$ of the antenna 33 and an actual height $H_{A2}$ of the second antenna 35 with respect to the road level GOK.

Given the actual heights $H_{A1}$, $H_{A2}$ of the antennas 33, 35, a determination is made for the absolute height of the eighth transponder 47a and, if its height does not allow a proper driving of the first vehicle 10 underneath the second vehicle 20, the air suspension 11 will be further regulated.

FIG. 2 shows another exemplary embodiment of the invention, in which the transceiver units 31, 34 are offset at the rear end and now are secured in the area of the rear axle 16 and on a stationary part of the fifth wheel 12. By a stationary part of the fifth wheel 12 is meant first of all one of the bearing blocks 12a, there being two blocks present, which hold the fifth wheel 12 relative to the vehicle chassis 17. Oftentimes a supporting crossarm extends between the bearing blocks 12a and engages with them, and the second transceiver unit 34 can also be fastened on this. In another embodiment of the fifth wheel 12, the bearing blocks 12a can also be fastened on a bearing plate 12b, which is usually mounted from above on a vehicle frame and/or auxiliary vehicle frame, not shown here.

As long as the transceiver unit 31 is fastened to the rear axle 16 of the first vehicle 10, no height correction by the lifting distance $H_{Luft}$ needs to be undertaken, since the rear axles 16 roll along the ground surface GOK and are not raised during the coupling process.

FIG. 3 shows in a perspective view the second vehicle 20 and the transponders 47a, 47b, 48a, 48b arranged at the front end 29. The eighth and ninth transponder 47a, 47b are located in the lower corners 27a of the front end 29 of the second vehicle 20, bordering on the bodywork floor 27. A tenth and eleventh transponder 48a, 48b are likewise arranged in upper corners 28a on the front end 29 of the second vehicle 20, adjoining a roof wall 28. With the aid of the eighth to eleventh transponders 47a, 47b, 48a, 48b, the sensor device 30 can reconstruct an image of the end face of the second vehicle 20, so that the first vehicle 10 can then approach the second vehicle 20 targeted exactly for the coupling process.

FIG. 4 shows a further embodiment in a side view, in which the sensor device 30 comprises only the single transceiver unit 31. For the precise detecting of the height condition of the second vehicle 20, an active transponder 50 is secured on its front end 29 immediately at a joint with the bodywork floor 27, being situated at first in the active zone of the transceiver unit 31 and serving the purpose of the distance measurement.

The active transponder 50 is additionally connected to a height measuring sensor 51, which measures without contact the vertical distance between the trailer plate 24 and the ground surface GOK. This metered value of the height measuring sensor 51 is continuously transmitted to the active transponder 50 and read out together with its encoding by the transceiver unit 31.

The active transponder 50 may be installed in a second recess 24a formed for this purpose in the trailer plate 24, as well as a second transponder 42 shown for example.

Figure 6:
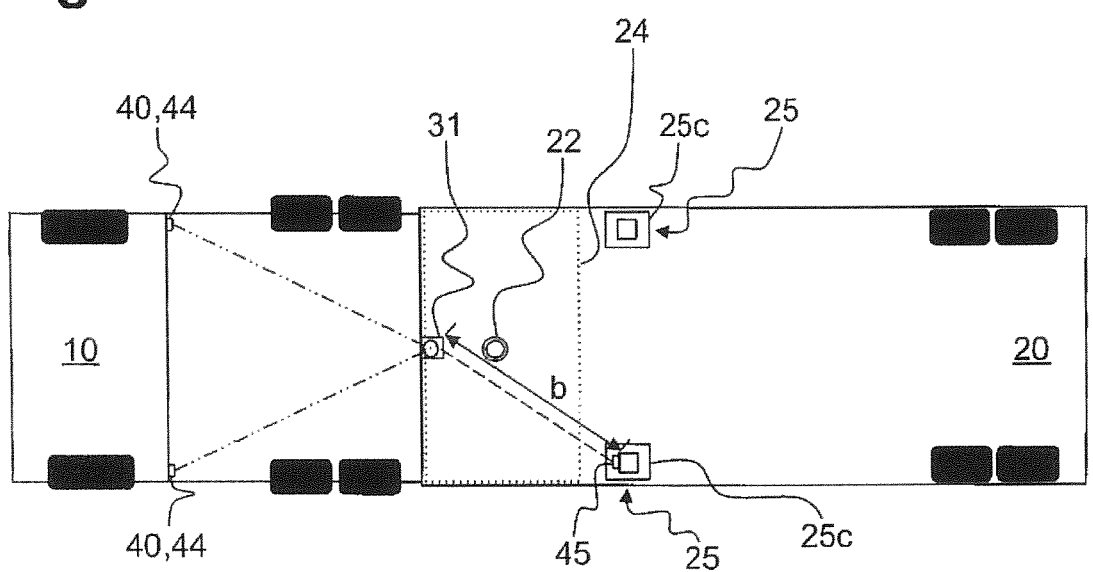
FIG. 6: a top view of a tractor per FIG. 5.

FIGS. 5 and 6 show a further exemplary embodiment of the invention, in which the sensor device 30 is arranged on the second vehicle 20. The transceiver unit 31 with the antenna 33 formed on it is installed in the area of the front end 29 of the second vehicle 20 in the trailer plate 24 and emits a radar signal, which is reflected by two fifth transponders 44 arranged on the first vehicle 10. The fifth transponder(s) 44 are fixed stationary on the rear wall of the driver's cabin 18 and enable a position detection of the first vehicle 10 backing up, by means of a distance measurement.

The distance of the trailer plate 24 of the second vehicle 20 above the ground surface GOK is an intrinsic feature of the system and it is calculated by a distance measurement from the antenna 33 of the transceiver unit 31 to a sixth transponder 45 situated on the telescopic section 25b of the support jack 25. The sixth transponder 45 is preferably arranged as far below as possible on the telescopic section 25, especially preferably on the support foot 25c of the telescopic section 25b.

The stationary section 25a extends downward in its axial direction at a right angle α to the trailer plate 24, exactly like the telescopic section 25b which is guided therein solely in translatory motion. The stationary section 25a after the mounting of the device according to the invention is spaced apart at a constant distance b, parallel to the extension of the trailer plate 24, from the antenna 33 of the transceiver unit 31. The direct distance between the antenna 33 and the sixth transponder 45 is measured by the transceiver unit 31 and corresponds to a measured distance c. The electronic controller 32 calculates from the constant distance b stored in its memory and the measured distance c a vertical distance a corresponding to the extension status of the support jack 25.

The metered values of the distance measurements to the transponders 44 and the calculated value of the distance a are relayed by the electronic controller 32 via a data radio transmitter 60 arranged on the second vehicle 20 as a data signal 62 to the first vehicle 10, still at a distance from yet approaching the first vehicle 10 prior to the coupling process, which has a data radio antenna 61 for receiving the data signal 62, being connected to the vehicle controller 36. The vehicle controller 36 may also comprise a plurality of vehicle controllers networked together. The vehicle controller 36 exerts influence on the control of engine and/or transmission 14, the vehicle steering 15 and the brake 19 of the autonomous driving first vehicle 10.

Figure 7:
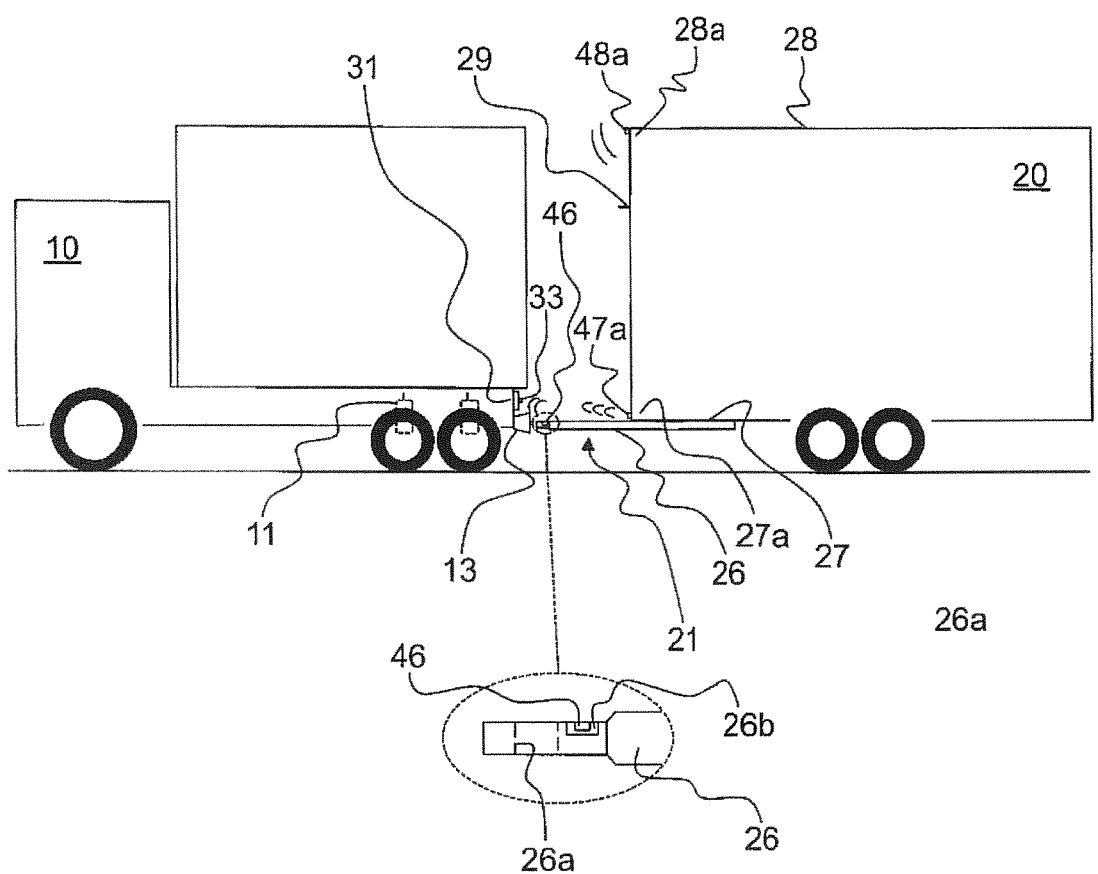
FIG. 7: a side view of a device according to a fourth embodiment, arranged on an articulated train.

FIG. 7 deals with a road train in the form of an articulated train. The first vehicle has at its rear end a pin or jaw coupling 13, in which the coupling means 21 of the second vehicle 20 is introduced and locked after coupling on the second vehicle 20. The coupling means 21 of the second vehicle 20 is a drawbar 26, which is designed as a rigid drawbar in the exemplary embodiment shown. At its distal end, a drawbar eye 26a is formed on the drawbar 26, through which a coupling pin (not shown) of the pin coupling 13 is inserted after the coupling process.

The first vehicle 10 furthermore has a transceiver unit 31 with an antenna 33, which is likewise arranged at the rear of the first vehicle 10, close to the pin coupling 13. In the area of the drawbar eye 26a, the drawbar 26 has a third recess 26b, in which a seventh transponder 46 is installed in protected manner. Basically, it is also possible to apply the seventh transponder 46 directly to the surface of the drawbar 26. In this way, the seventh transponder 46 will be identified even better by the transceiver unit 31, however it is exposed to a greater risk of damage during driving operation.

The contour of the front end 29 of the second vehicle 20 is bounded by an eighth and ninth transponder 47a, 47b located at the lower corners 27a and by a tenth and eleventh transponder 48a, 48b located at the upper corners 28a and their position can be detected by the transceiver unit 31. In the representation of FIG. 7, only the eighth and tenth transponders 47a, 48a lying in front in the plane of the drawing can be seen.

LIST OF REFERENCE SYMBOLS

10 First vehicle
11 Air suspension
12 Fifth wheel
12a Bearing block
12b Bearing plate
13 Pin coupling
14 Engine and transmission
15 Vehicle steering
16 Rear axle
17 Vehicle chassis
18 Driver's cabin
19 Brake 20 Second vehicle
21 Coupling means
22 Kingpin
22a Fastening flange
22b Upper collar
22c Locking section
22d Lower collar
22e Bottom of lower collar
22f First recess
23 Bottom side of second vehicle
24 Trailer plate
24a Second recess
25 Support jack
25a Stationary section of support jack
25b Telescopic section of support jack
25c Support foot
26 Drawbar
26a Drawbar eye
26b Third recess
27 Bodywork floor
27a Lower corners
28 Roof wall
28a Upper corners
29 Front end of second vehicle
29a Add-on unit
29b Front end of add-on unit
30 Sensor device
31 Transceiver unit
32 Electronic controller
33 Antenna
34 Second transceiver unit
35 Second antenna
36 Vehicle controller
40 Reference point
41 First transponder (kingpin)
42 Second transponder (trailer plate)
43a Third transponder (support jack)
43b Fourth transponder (support jack)
44 Fifth transponder (first vehicle)
45 Sixth transponder (support jack extended)
46 Seventh transponder (drawbar eye)
47a Eighth transponder (lower corner)
47b Ninth transponder (lower corner)
48a Tenth transponder (upper corner)
48b Eleventh transponder (upper corner)
49 Twelfth transponder (add-on unit)
50 Active transponder (front edge of second vehicle)
51 Height measuring sensor
60 Data radio transmitter
61 Data radio antenna
62 Data signal
α a Support jack/trailer plate angle
a Trailer plate/GOK spacing
b Transceiver unit/support jack spacing
c Support jack measuring distance
GOK Road level, ground surface
Δh Vertical height clearance
$H_{A1min}$ Lowest height, antenna
$H_{A2min}$ Lowest height, second antenna
$H_{Luft}$ Lifting distance, air suspension
$H_{A1}$ Actual height, antenna
$H_{A2}$ Actual height, second antenna
S Swivel axis, kingpin
X Vehicle lengthwise axis

What is claimed is:

1. A road train on which is mounted a device for detecting the position of a first or second vehicle to be coupled together, wherein the road train comprises a first and at least one second vehicle and the device comprises a sensor device which is arranged on the first or second vehicle and which detects at least one reference point of the other second or first vehicle by measurement techniques,
wherein the sensor device has at least one transceiver unit, and on the at least one reference point there can be fastened a transponder, which reflects a radio signal of the transceiver unit,
wherein the sensor device comprises an electronic controller,
and the transceiver unit is situated on the first vehicle and the at least one transponder is situated on the second vehicle,
wherein the electronic controller receives a signal regarding a height condition of an air suspension and calculates from a travel time of the radio signal a direct distance to the at least one transponder.

2. The device road train as claimed in claim 1, wherein multiple reference points are present on the other second or first vehicle, at each of which there can be secured a transponder, and each transponder encodes an echo individually such that it can be distinctly coordinated with the particular transponder.

3. The road train as claimed in claim 1, wherein the sensor device comprises at least one antenna, which is connected to the respective transceiver unit.

4. The road train as claimed in claim 3, wherein each transceiver unit sends and receives a radar signal via the antenna.

5. The road train as claimed in claim 3, wherein a second transceiver unit with a second antenna is arranged in a vertical height clearance (Δh) from the transceiver unit and is connected to the electronic controller.

6. The road train as claimed in claim 1, wherein an active transponder is situated at the end of the second vehicle facing toward the first vehicle, wherein the active transponder is connected to a height measuring sensor and a measurement signal of the height measuring sensor together with its individual encoding is relayed to the transceiver unit.

7. The road train as claimed in claim 1, wherein the second vehicle comprises a coupling means.

8. The road train as claimed in claim 7, wherein the coupling means is a kingpin fastened to the second vehicle.

9. The road train as claimed in claim 8, characterized in that wherein the kingpin comprises a fastening flange, an upper collar connected to the latter at a bottom, a small-diameter locking section and a lower collar wherein a first recess is made in a bottom side of the lower collar, in which a first transponder is installed.

10. The road train as claimed in claim 1, wherein a trailer plate is formed on a bottom side of the second vehicle, which in a coupled condition is supported on a fifth wheel, wherein a second recess is formed in the trailer plate, in which a second transponder is installed.

11. The road train as claimed in claim 1, at least one support jack is arranged on the second vehicle, to which a third and/or fourth transponder is secured.

12. The road train as claimed in claim 3, wherein a lowest height condition ($H_{A1min}$, $H_{A2min}$) of the antenna(s) above a road level (GOK) with the air suspension lowered can be entered in the electronic controller.

13. The road train as claimed in claim 12, wherein the electronic controller calculates an actual height ($H_{A1}$, $H_{A2}$) of the antenna(s) from a lifting distance ($H_{Luft}$) of the air suspension and the lowest height condition ($H_{min}$).

14. The road train as claimed in claim 7, wherein the coupling means is a drawbar eye situated at an end of a drawbar, while a seventh transponder is situated on the drawbar and/or in a section around the drawbar eye.

\* \* \* \* \*

UNITED STATES PATENT AND TRADEMARK OFFICE
CERTIFICATE OF CORRECTION

PATENT NO. : 11,034,200 B2
APPLICATION NO. : 16/336280
DATED : June 15, 2021
INVENTOR(S) : Christian Genheimer et al.

Page 1 of 1

It is certified that error appears in the above-identified patent and that said Letters Patent is hereby corrected as shown below:

In the Claims

Claim 2, Line 1, delete the word "device".

Claim 9, Lines 1 and 2, delete the words "characterized in that".

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*